(12) United States Patent
Chen et al.

(10) Patent No.: US 9,075,480 B2
(45) Date of Patent: Jul. 7, 2015

(54) OPTICAL TOUCH DEVICE AND METHOD FOR CALCULATING COORDINATE OF TOUCH POINT

(71) Applicant: Wistron Corporation, New Taipei (TW)

(72) Inventors: Shih-Wen Chen, New Taipei (TW); Yu-Yen Chen, New Taipei (TW); Ching-An Cho, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 14/295,336

(22) Filed: Jun. 4, 2014

(65) Prior Publication Data

US 2015/0153903 A1 Jun. 4, 2015

(30) Foreign Application Priority Data

Nov. 29, 2013 (TW) .............................. 102143859 A
Nov. 29, 2013 (TW) .............................. 102143861 A

(51) Int. Cl.
*G06F 3/042* (2006.01)

(52) U.S. Cl.
CPC .................................... *G06F 3/0421* (2013.01)

(58) Field of Classification Search
CPC ......... G06F 3/041; G06F 3/042; G06F 3/017; G06F 3/0304; G09G 1/00
See application file for complete search history.

(56) References Cited

U.S. PATENT DOCUMENTS

2011/0261013 A1* 10/2011 Lin et al. ....................... 345/175

* cited by examiner

*Primary Examiner* — Michael Faragalla
(74) *Attorney, Agent, or Firm* — Winston Hsu; Scott Margo

(57) ABSTRACT

An optical touch device utilizes a weighting to integrate two coordinates of a touch point sensed by two sets of image sensing units, so as to calculate an output coordinate of the touch point performed on a central touch area. Accordingly, the invention can effectively prevent a touch trajectory from shifting on the central touch area, such that the touch trajectory will be much smoother on the central touch area.

10 Claims, 10 Drawing Sheets

OPTICAL TOUCH DEVICE AND METHOD FOR CALCULATING COORDINATE OF TOUCH POINT

BACKGROUND OF THE INVENTION

1. Field of the Invention

The invention relates to an optical touch device and a method for calculating coordinate of touch point and, more particularly, to an optical touch device and a method for calculating coordinate of touch point capable of preventing a touch trajectory from shifting.

2. Description of the Prior Art

Since consumer electronic products have become more and more lighter, thinner, shorter, and smaller, there is no space on these products for containing a conventional input device, such as mouse, keyboard, etc. With development of touch technology, in various kinds of consumer electronic products (e.g. display device, all-in-one device, mobile phone, personal digital assistant (PDA), etc.), a touch device has become a main tool for data input. Compared with other touch design, such as a resistive touch design, a capacitive touch design, an ultrasonic touch design, or a projective touch design, an optical touch design has lower cost and is easier to use, especially for large-size touch display.

A conventional optical touch device senses a touch point indicated by a touch object (e.g. finger or stylus) on an indication plane by two image sensing units arranged oppositely. When the image sensing units sense the touch object on the indication plane, a processing unit of the optical touch device can calculate the touch point indicated by the touch object accordingly. However, since the resolution of the image sensing unit is limited, the size of the optical touch device is also limited accordingly.

Referring to FIG. 1, FIG. 1 is a schematic diagram illustrating an optical touch device 5 of the prior art. As shown in FIG. 1, the optical touch device 5 disposes four image sensing units 52, 54, 56, 58 at the center of an indication plane 50, wherein the image sensing units 52, 58 are used for sensing the right touch area of the indication plane 50 and the image sensing units 54, 56 are used for sensing the left touch area of the indication plane 50. Accordingly, the optical touch device 5 may have a large size.

As shown in FIG. 1, a central touch area 500 is defined between the image sensing units 52, 54, 56, 58, wherein a left boundary 502 of the central touch area 500 connects the image sensing units 52, 58 and a right boundary 504 of the central touch area 500 connects the image sensing units 54, 56. In general, a touch operation performed on the central touch area 500 can be sensed by the image sensing units 52, 58 or the image sensing units 54, 56. As shown in FIG. 1, a touch trajectory 60 is sensed by the image sensing units 54, 56 and another touch trajectory 62 is sensed by the image sensing units 52, 58. For the image sensing units 54, 56, the touch trajectory 60 will shift while it is close to the right boundary 504. Similarly, for the image sensing units 52, 58, the touch trajectory 62 will shift while it is close to the left boundary 502. Accordingly, the transition between the touch trajectories 60 and 62 within the central touch area 500 will be uneven and this phenomenon will affect the visual effect of a user.

SUMMARY OF THE INVENTION

The invention provides an optical touch device and a method for calculating coordinate of touch point capable of preventing a touch trajectory from shifting, so as to solve the aforesaid problems.

According to the claimed invention, an optical touch device comprises an indication plane having a first edge and a second edge, the first edge being opposite to the second edge; a first image sensing unit and a second image sensing unit separately disposed on the first edge; a third image sensing unit and a fourth image sensing unit separately disposed on the second edge, the first image sensing unit being opposite to the fourth image sensing unit, the second image sensing unit being opposite to the third image sensing unit, a central touch area being defined between the first image sensing unit, the second image sensing unit, the third image sensing unit and the fourth image sensing unit; and a processing unit electrically connected to the first image sensing unit, the second image sensing unit, the third image sensing unit and the fourth image sensing unit; wherein when a touch gesture is performed on the central touch area, the first image sensing unit senses a first image, the second image sensing unit senses a second image, the third image sensing unit senses a third image and the fourth image sensing unit senses a fourth image; the processing unit calculates a first coordinate of a touch point according to the first image and the fourth image, calculates a second coordinate of the touch point according to the second image and the third image, and integrates the first coordinate and the second coordinate with each other by a weighting, so as to calculate an output coordinate of the touch point.

According to the claimed invention, the processing unit calculates the output coordinate of the touch point by equations as follows:

$$X_T = X_1 \times W + X_2 \times (1-W); \text{ and}$$

$$Y_T = Y_1 \times W + Y_2 \times (1-W);$$

wherein $(X_T, Y_T)$ represents the output coordinate, $(X_1, Y_1)$ represents the first coordinate, $(X_2, Y_2)$ represents the second coordinate, and W represents the weighting.

According to the claimed invention, a first boundary of the central touch area connects the first image sensing unit and the fourth image sensing unit, a second boundary of the central touch area connects the second image sensing unit and the third image sensing unit, a first critical line and a second critical line are defined in the central touch area, a threshold distance is between the first critical line and the first boundary, the threshold distance is between the second critical line and the second boundary; when the touch point is located between the first boundary and the first critical line, the weighting is equal to 0; when the touch point is located between the second boundary and the second critical line, the weighting is equal to 1; when the touch point is located between the first critical line and the second critical line, the weighting is equal to $$\frac{d-T}{D-2T},$$

d represents a distance between the touch point and the first boundary, T represents the threshold distance, and D represents a distance between the first boundary and the second boundary.

According to the claimed invention, when the processing unit calculates N touch points according to the first image and the fourth image and calculates M touch points according to the second image and the third image, the processing unit determines whether N is larger than M, N and M are positive integers; when N is larger than M, the processing unit calculates and outputs coordinates of the N touch points; when N is smaller than M, the processing unit calculates and outputs coordinates of the M touch points.

According to the claimed invention, when N is equal to M, the processing unit matches the N touch points and the M touch points one by one, so as to obtain N pairs of touch points; the processing unit integrates coordinates of the N pairs of touch points by the weighting, so as to calculate N output coordinates of the N pairs of touch points.

According to the claimed invention, a method for calculating coordinate of touch point is adapted to an optical touch device, the optical touch device comprises an indication plane, a first image sensing unit, a second image sensing unit, a third image sensing unit and a fourth image sensing unit, the indication plane has a first edge and a second edge, the first edge is opposite to the second edge, the first image sensing unit and the second image sensing unit are separately disposed on the first edge, the third image sensing unit and the fourth image sensing unit are separately disposed on the second edge, the first image sensing unit is opposite to the fourth image sensing unit, the second image sensing unit is opposite to the third image sensing unit, a central touch area is defined between the first image sensing unit, the second image sensing unit, the third image sensing unit and the fourth image sensing unit, the method comprises steps of when a touch gesture is performed on the central touch area, the first image sensing unit sensing a first image, the second image sensing unit sensing a second image, the third image sensing unit sensing a third image and the fourth image sensing unit sensing a fourth image; calculating a first coordinate of a touch point according to the first image and the fourth image; calculating a second coordinate of the touch point according to the second image and the third image; and integrating the first coordinate and the second coordinate with each other by a weighting, so as to calculate an output coordinate of the touch point.

According to the claimed invention, the output coordinate of the touch point is calculated by equations as follows:

$$X_T = X_1 \times W + X_2 \times (1-W); \text{ and}$$

$$Y_T = Y_1 \times W + Y_2 \times (1-W);$$

wherein $(X_T, Y_T)$ represents the output coordinate, $(X_1, Y_1)$ represents the first coordinate, $(X_2, Y_2)$ represents the second coordinate, and W represents the weighting.

According to the claimed invention, a first boundary of the central touch area connects the first image sensing unit and the fourth image sensing unit, a second boundary of the central touch area connects the second image sensing unit and the third image sensing unit, a first critical line and a second critical line are defined in the central touch area, a threshold distance is between the first critical line and the first boundary, the threshold distance is between the second critical line and the second boundary; when the touch point is located between the first boundary and the first critical line, the weighting is equal to 0; when the touch point is located between the second boundary and the second critical line, the weighting is equal to 1; when the touch point is located between the first critical line and the second critical line, the weighting is equal to $$\frac{d-T}{D-2T},$$

d represents a distance between the touch point and the first boundary, T represents the threshold distance, and D represents a distance between the first boundary and the second boundary.

According to the claimed invention, the method further comprises steps of calculating N touch points according to the first image and the fourth image and calculating M touch points according to the second image and the third image, wherein N and M are positive integers; determining whether N is larger than M; when N is larger than M, calculating and outputting coordinates of the N touch points; and when N is smaller than M, calculating and outputting coordinates of the M touch points.

According to the claimed invention, the method further comprises steps of when N is equal to M, matching the N touch points and the M touch points one by one, so as to obtain N pairs of touch points; and integrating coordinates of the N pairs of touch points by the weighting, so as to calculate N output coordinates of the N pairs of touch points.

As mentioned in the above, the invention utilizes a weighting to integrate two coordinates of a touch point sensed by two sets of image sensing units, so as to calculate an output coordinate of the touch point performed on a central touch area. Accordingly, the invention can effectively prevent a touch trajectory from shifting on the central touch area, such that the touch trajectory will be much smoother on the central touch area.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
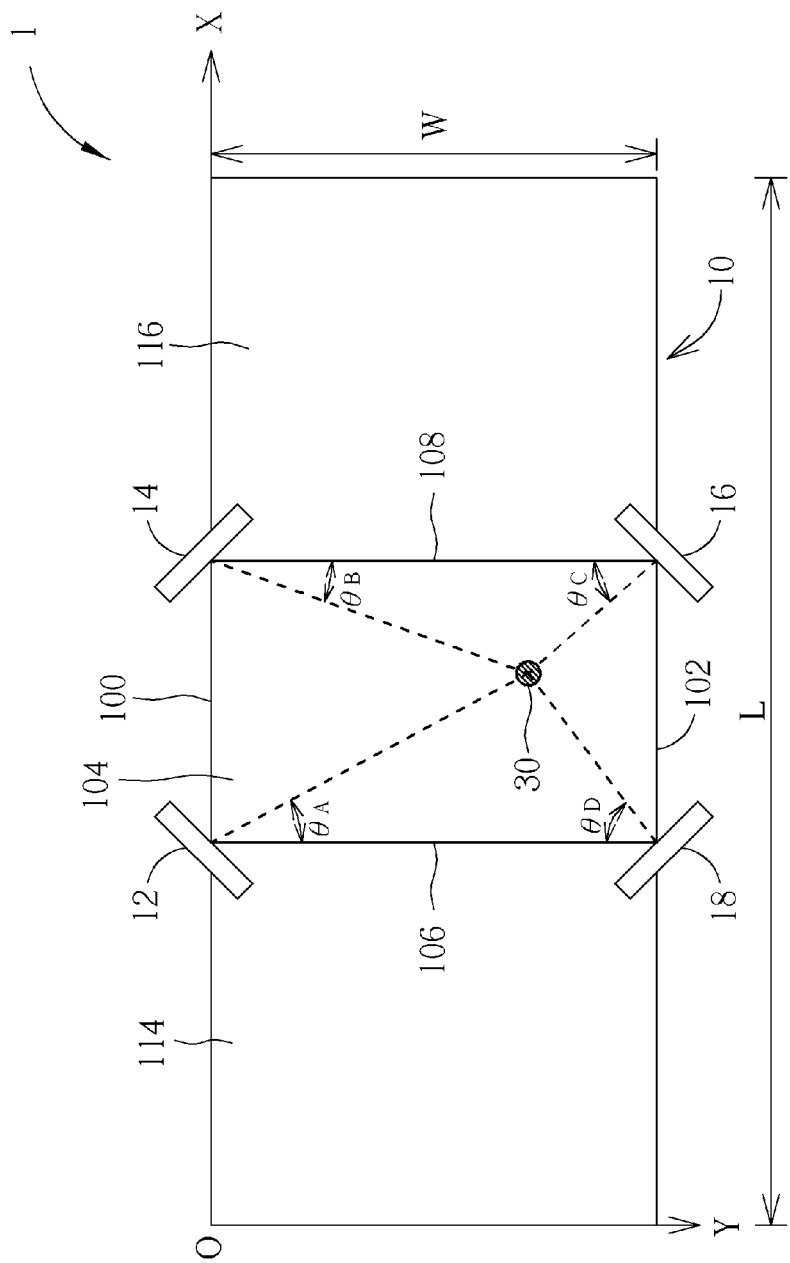
FIG. 2 is a schematic diagram illustrating an optical touch device according to an embodiment of the invention.
Figure 3:
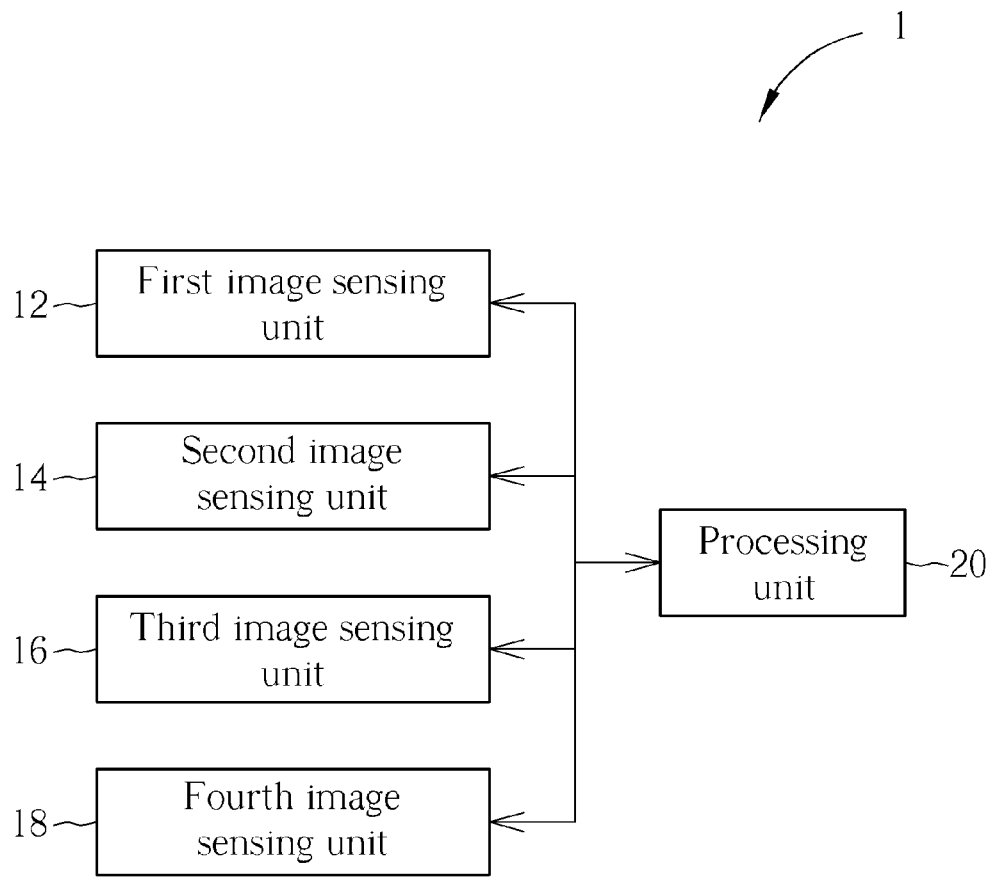
FIG. 3 is a functional block diagram illustrating the optical touch device shown in FIG. 2.

Referring to FIGS. 2 and 3, FIG. 2 is a schematic diagram illustrating an optical touch device 1 according to an embodiment of the invention, and FIG. 3 is a functional block diagram illustrating the optical touch device 1 shown in FIG. 2. As shown in FIGS. 2 and 3, the optical touch device 1 comprises an indication plane 10, a first image sensing unit 12, a second image sensing unit 14, a third image sensing unit 16, a fourth image sensing unit 18 and a processing unit 20, wherein the processing unit 20 is electrically connected to the first image sensing unit 12, the second image sensing unit 14, the third image sensing unit 16 and the fourth image sensing unit 18.

In practical applications, the indication plane 10 may be a display panel (e.g. liquid crystal display panel), a white board, a black board, a projecting screen or other planes for a user to perform touch operation; the first image sensing unit 12, the second image sensing unit 14, the third image sensing unit 16 and the fourth image sensing unit 18 may be, but not limited to, charge-coupled device (CCD) sensors or complementary metal-oxide semiconductor (CMOS) sensors; and the processing unit 20 may be a processor or a controller with data calculation/processing function. In practical applications, a plurality of light emitting units (e.g. light emitting diodes) may be disposed adjacent to the first image sensing unit 12, the second image sensing unit 14, the third image sensing unit 16 and the fourth image sensing unit 18 or a light bar may be disposed around the indication plane 10, so as to provide light for touch operation. Once the light emitting units are disposed adjacent to the first image sensing unit 12, the second image sensing unit 14, the third image sensing unit 16 and the fourth image sensing unit 18, there may be light reflecting frame or light absorbing frame disposed around the indication plane 10 based on practical applications.

The indication plane 10 has a first edge 100 and a second edge 102, wherein the first edge 100 is opposite to the second edge 102. The first image sensing unit 12 and the second image sensing unit 14 are separately disposed on the first edge 100, and the third image sensing unit 16 and the fourth image sensing unit 18 are separately disposed on the second edge 102, wherein the first image sensing unit 12 is opposite to the fourth image sensing unit 18, the second image sensing unit 14 is opposite to the third image sensing unit 16, and a central touch area 104 is defined between the first image sensing unit 12, the second image sensing unit 14, the third image sensing unit 16 and the fourth image sensing unit 18. Furthermore, a first boundary 106 of the central touch area 104 connects the first image sensing unit 12 and the fourth image sensing unit 18, and a second boundary 108 of the central touch area 104 connects the second image sensing unit 14 and the third image sensing unit 16.

Figure 1:
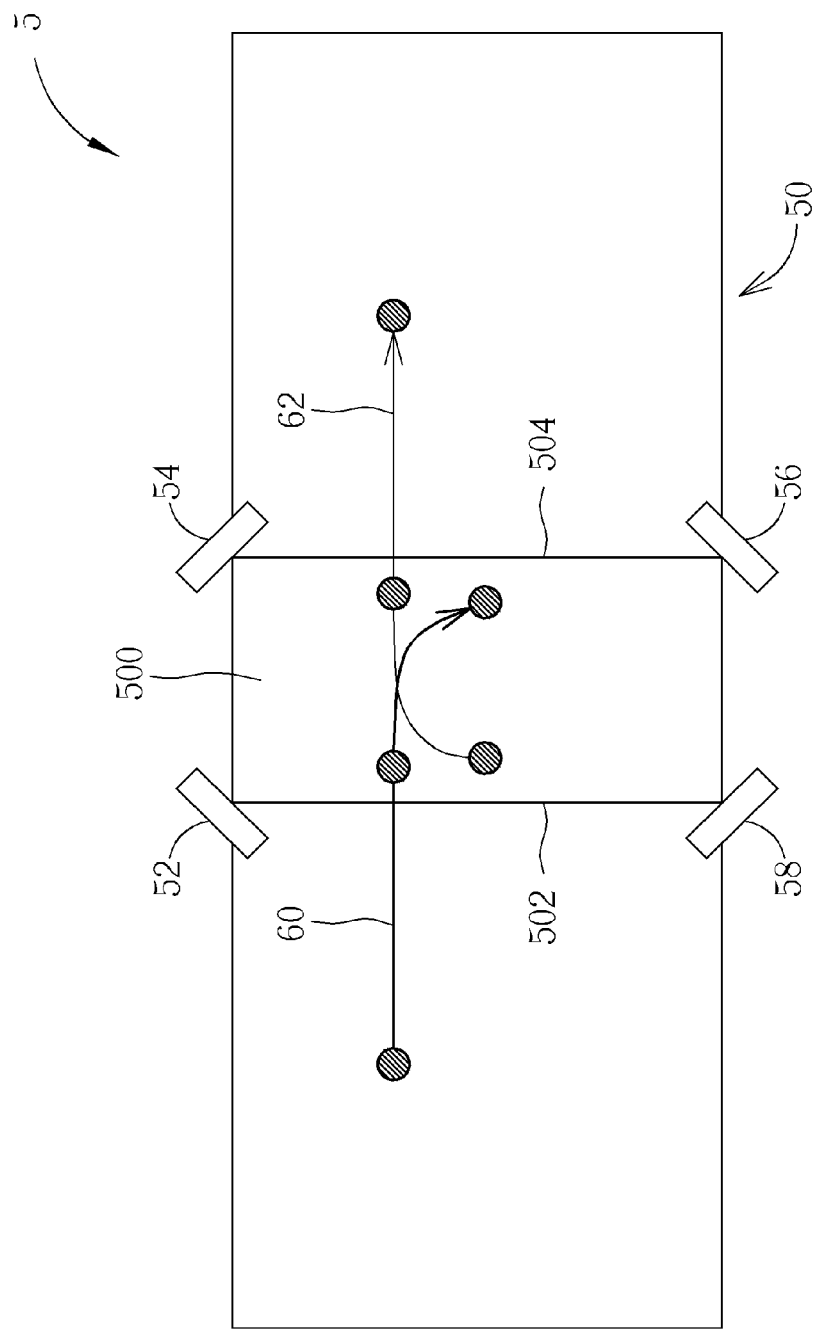
FIG. 1 is a schematic diagram illustrating an optical touch device of the prior art.

The invention may set an X-Y rectangular coordinate system and an origin O thereof in the embodiment shown in FIG. 1, wherein L represents a length of the indication plane 10 and W represents a width of the indication plane 10. The coordinate of the first image sensing unit 12 may be represented as $(X_A, Y_A)$, the coordinate of the second image sensing unit 14 may be represented as $(X_B, Y_B)$, the coordinate of the third image sensing unit 162 may be represented as $(X_C, Y_C)$, and the coordinate of the fourth image sensing unit 18 may be represented as $(X_D, Y_D)$. As shown in FIG. 1, when a touch gesture is performed on the central touch area 104 to generate a touch point 30, the first image sensing unit 12 senses an angle $\theta_A$ related to the touch point 30, the second image sensing unit 14 senses an angle $\theta_B$ related to the touch point 30, the third image sensing unit 16 senses an angle $\theta_C$ related to the touch point 30, and the fourth image sensing unit 18 senses an angle $\theta_D$ related to the touch point 30. It should be noted that the angles $\theta_A, \theta_B, \theta_C, \theta_D$ can be calculated and obtained easily by one skilled in the art, so the calculation will not be depicted in detail herein. Afterward, the triangulation algorithm can be used to calculate the coordinate $(X_E, Y_E)$ of the touch point 30 by the following equation 1 according to the first image sensing unit 12 and the fourth image sensing unit 18 or, alternatively, the triangulation algorithm can be used to calculate the coordinate $(X_E, Y_E)$ of the touch point 30 by the following equation 2 according to the second image sensing unit 14 and the third image sensing unit 16.

$$\begin{cases} Y_E = \dfrac{X_D - X_A + \dfrac{W}{L} Y_A \tan\theta_A + \dfrac{W}{L} Y_D \tan\theta_D}{\dfrac{W}{L}(\tan\theta_A + \tan\theta_D)} \\ X_E = \dfrac{W}{L} \times Y_E \times \tan\theta_A - \dfrac{W}{L} Y_A \tan\theta_A + X_A \end{cases} \quad \text{Equation 1}$$

$$\begin{cases} Y_E = \dfrac{X_B - X_C + \dfrac{W}{L} Y_B \tan\theta_B + \dfrac{W}{L} Y_C \tan\theta_C}{\dfrac{W}{L}(\tan\theta_B + \tan\theta_C)} \\ X_E = X_B - \dfrac{W}{L} \times Y_E \times \tan\theta_B + \dfrac{W}{L} Y_B \tan\theta_B \end{cases} \quad \text{Equation 2}$$

Figure 4:
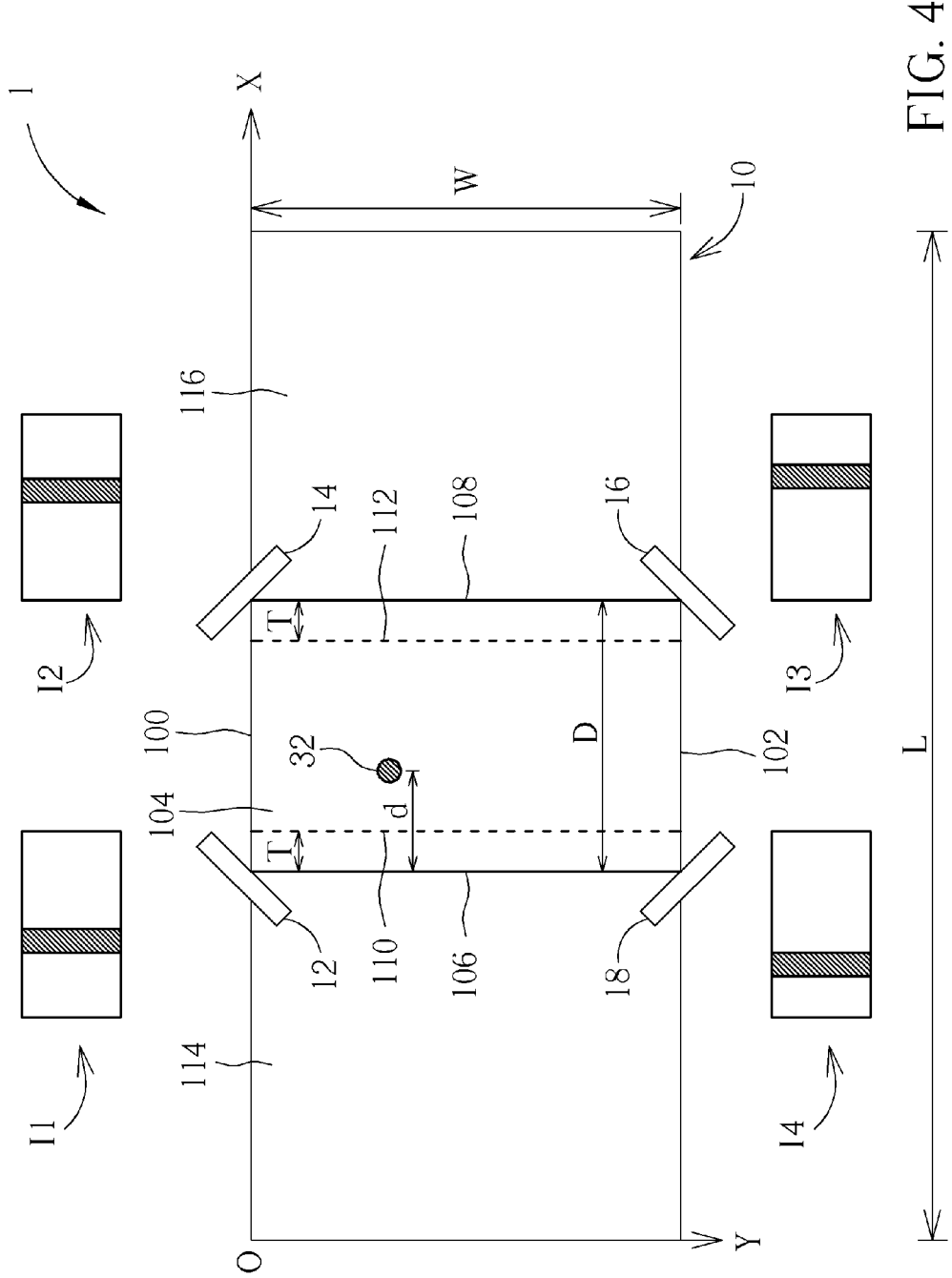
FIG. 4 is a schematic diagram illustrating one touch point generated on the central touch area.

Referring to FIG. 4, FIG. 4 is a schematic diagram illustrating one touch point 32 generated on the central touch area 104. As shown in FIG. 4, a first critical line 110 and a second critical line 112 are defined in the central touch area 104, wherein a threshold distance T is between the first critical line 110 and the first boundary 106, and the threshold distance T is also between the second critical line 112 and the second boundary 108.

As shown in FIG. 4, when a touch gesture is performed on the central touch area 104 to generate one touch point 32, the first image sensing unit 12 senses a first image I1, the second image sensing unit 14 senses a second image I2, the third image sensing unit 16 senses a third image I3 and the fourth image sensing unit 18 senses a fourth image I4. Since there is only one touch point 32 generated on the central touch area 104, there is only one light shielding signal sensed in each of the first image I1, the second image I2, the third image I3 and the fourth image I4. Afterward, the processing unit 20 can utilize the aforesaid equation 1 to calculate a first coordinate $(X_1, Y_1)$ of the touch point 32 according to the first image I1 and the fourth image I4, utilizes the aforesaid equation 2 to calculate a second coordinate $(X_2, Y_2)$ of the touch point 32 according to the second image I2 and the third image I3, and integrate the first coordinate $(X_1, Y_1)$ and the second coordinate $(X_2, Y_2)$ with each other by a weighting W, so as to calculate an output coordinate $(X_T, Y_T)$ of the touch point 32.

In this embodiment, the processing unit 20 may calculate the output coordinate $(X_T, Y_T)$ of the touch point 32 by an equation 3 below.

$$\begin{cases} X_T = X_1 \times W + X_2 \times (1 - W) \\ Y_T = Y_1 \times W + Y_2 \times (1 - W) \end{cases} \quad \text{Equation 3}$$

Furthermore, the weighting W may be set through the following manner. When the touch point 32 is located between the first boundary 106 and the first critical line 110, the weighting W may be set to be equal to 0; when the touch point 32 is located between the second boundary 108 and the second critical line 112, the weighting W may be set to be equal to 1; and when the touch point 32 is located between the first critical line 110 and the second critical line 112, the weighting W may be set to be equal to $$\frac{d - T}{D - 2T},$$

wherein d represents a distance between the touch point 32 and the first boundary 106, T represents the aforesaid threshold distance, and D represents a distance between the first boundary 106 and the second boundary 108.

When the touch point 32 is located between the first boundary 106 and the first critical line 110, it means that the touch point 32 is too close to the first boundary 106. Therefore, the invention takes the second coordinate ($X_2$, $Y_2$) calculated according to the second image I2 and the third image I3 to be the output coordinate ($X_T$, $Y_T$) of the touch point 32, so as to prevent the touch trajectory from shifting between the first boundary 106 and the first critical line 110. Similarly, when the touch point 32 is located between the second boundary 108 and the second critical line 112, it means that the touch point 32 is too close to the second boundary 108. Therefore, the invention takes the first coordinate ($X_1$, $Y_1$) calculated according to the first image I1 and the fourth image I4 to be the output coordinate ($X_T$, $Y_T$) of the touch point 32, so as to prevent the touch trajectory from shifting between the second boundary 108 and the second critical line 112.

In the embodiment shown in FIG. 4, the touch point 32 is located between the first critical line 110 and the second critical line 112. Therefore, the invention takes the weighting $$W = \frac{d-T}{D-2T}$$

into the aforesaid equation 3 to integrate the first coordinate ($X_1$, $Y_1$) and the second coordinate ($X_2$, $Y_2$) with each other, so as to calculate the output coordinate ($X_T$, $Y_T$) of the touch point 32. Accordingly, the invention can effectively prevent the touch trajectory from shifting on the central touch area 104, such that the touch trajectory will be much smoother on the central touch area 104.

It should be noted that the invention may utilizes the second image sensing unit 14 and the third image sensing unit 16 to calculate the number of touch points and the corresponding coordinates by a well-known optical touch principle when the touch points are generated on the left touch area 114 beside the central touch area 104; and the invention may utilizes the first image sensing unit 12 and the fourth image sensing unit 18 to calculate the number of touch points and the corresponding coordinates by a well-known optical touch principle when the touch points are generated on the right touch area 116 beside the central touch area 104.

Figure 5:
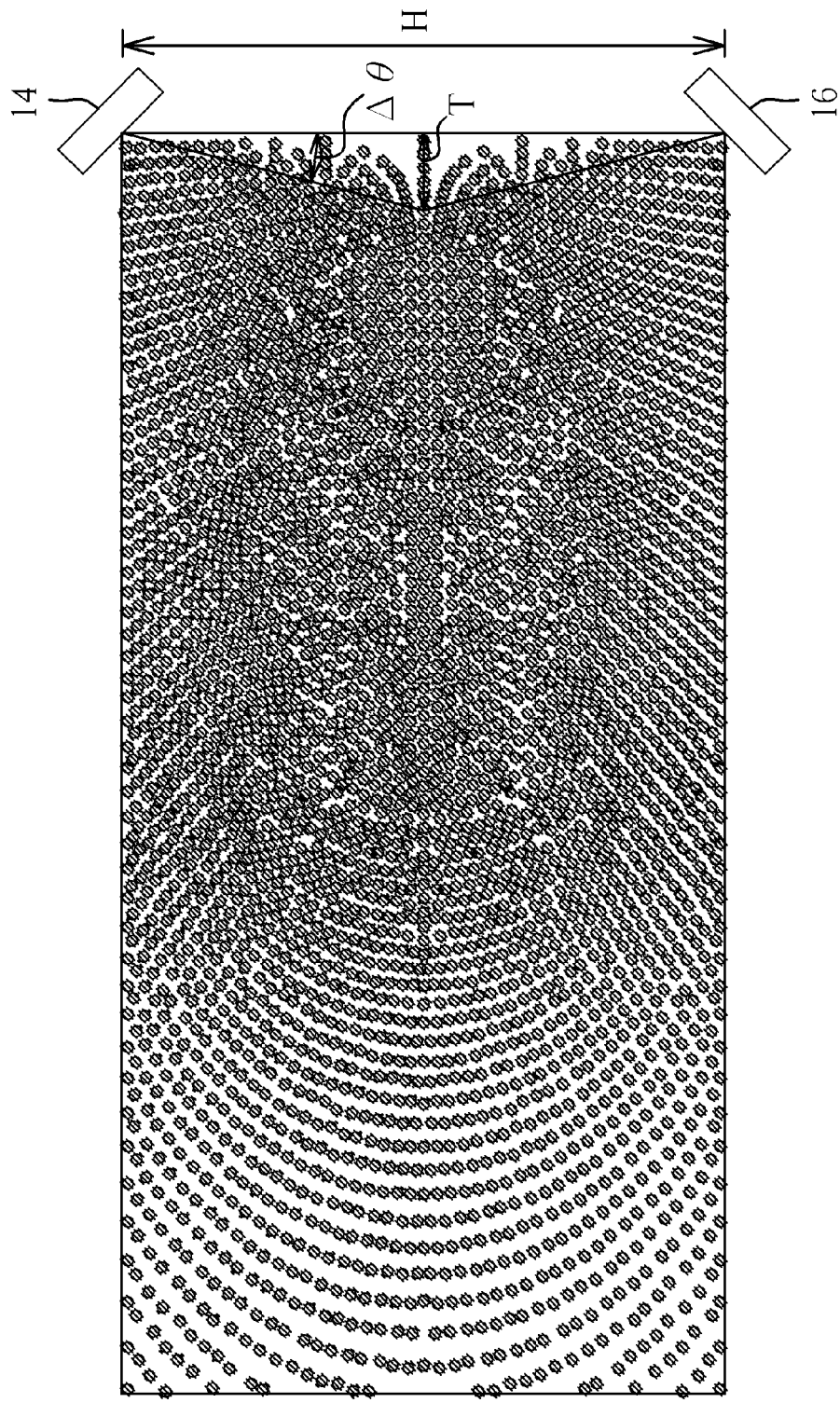
FIG. 5 is a schematic diagram illustrating how to set the threshold distance by the second image sensing unit and the third image sensing unit.

Referring to FIG. 5, FIG. 5 is a schematic diagram illustrating how to set the threshold distance T by the second image sensing unit 14 and the third image sensing unit 16. As shown in FIG. 5, the invention may utilize the second image sensing unit 14 and the third image sensing unit 16 to perform a triangulation method, so as to calculate all usable touch points, wherein the sensing angle range of each of the second image sensing unit 14 and the third image sensing unit 16 may be, but not limited to, 0-90 degrees and the interval thereof may be, but not limited to, 1 degree. In the right triangular area, the density of the usable touch points is few and scattered and the usable touch points are distributed as a fan-shaped and spread rightward. Therefore, the touch points within the triangular area will shift seriously. According to the precision requirement of practical touch operation, the invention may set an angle threshold $\Delta\theta$ and assume a distance between the second image sensing unit 14 and the third image sensing unit 16 to be H, so the threshold distance T may be set as $$\frac{H}{2}\tan\Delta\theta.$$

For example, if the distance H between the second image sensing unit 14 and the third image sensing unit 16 is 120 cm and the angle threshold $\Delta\theta$ is set as 10 degrees, the threshold distance T may be set as 10.57 cm.

In this embodiment, all of the touch points are assumed to be located within the central touch area 104. When the processing unit 20 calculates N touch points according to the first image I1 and the fourth image I4 and calculates M touch points according to the second image I2 and the third image I3, the processing unit 20 may determine whether N is larger than M, wherein N and M are positive integers. When N is larger than M, the processing unit 20 will calculate and output coordinates of the N touch points by the aforesaid equation 1. When N is smaller than M, the processing unit 20 will calculate and output coordinates of the M touch points by the aforesaid equation 2. When N is equal to M, the processing unit 20 will match the N touch points and the M touch points one by one, so as to obtain N pairs of touch points. Then, the processing unit 20 will utilize the aforesaid weighting W to integrate coordinates of the N pairs of touch points by the aforesaid equation 3, so as to calculate N output coordinates of the N pairs of touch points.

Figure 6:
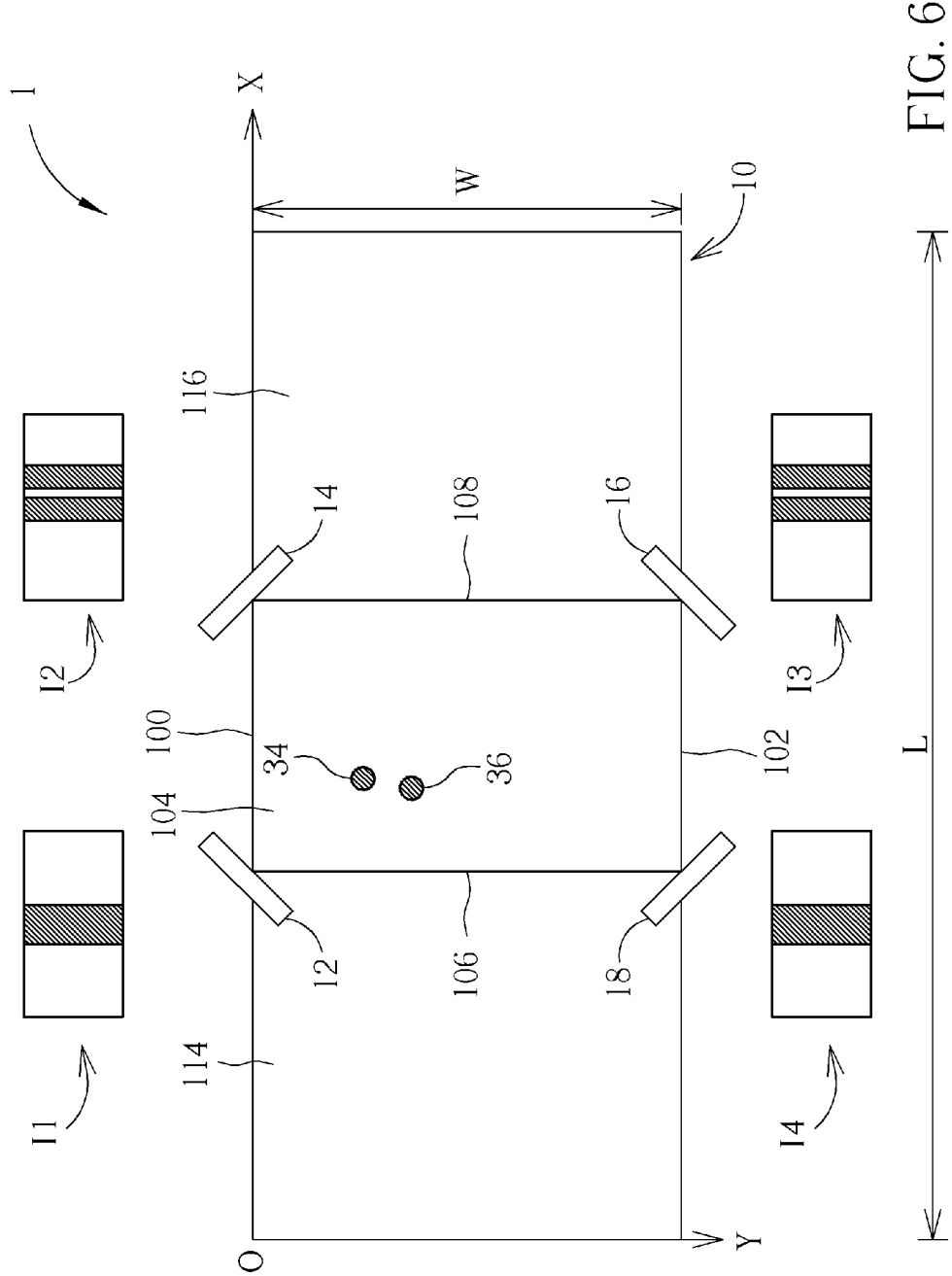
FIG. 6 is a schematic diagram illustrating two touch points generated on the central touch area.

Referring to FIG. 6, FIG. 6 is a schematic diagram illustrating two touch points 34, 36 generated on the central touch area 104. As shown in FIG. 6, two touch points 34, 36 overlap within the first image I1 and the fourth image I4, so the processing unit 20 will calculate only one touch point (i.e. N=1) according to the first image I1 and the fourth image I4. Furthermore, the two touch points 34, 36 are separated within the second image I2 and the third image I3, so the processing unit 20 will calculate two touch points (i.e. M=2) according to the second image I2 and the third image I3. At this time, the processing unit 20 can immediately calculate and output the coordinates of the two touch points 34, 36 by the aforesaid equation 2, so as to avoid mis-identification due to overlapped touch points.

Figure 7:
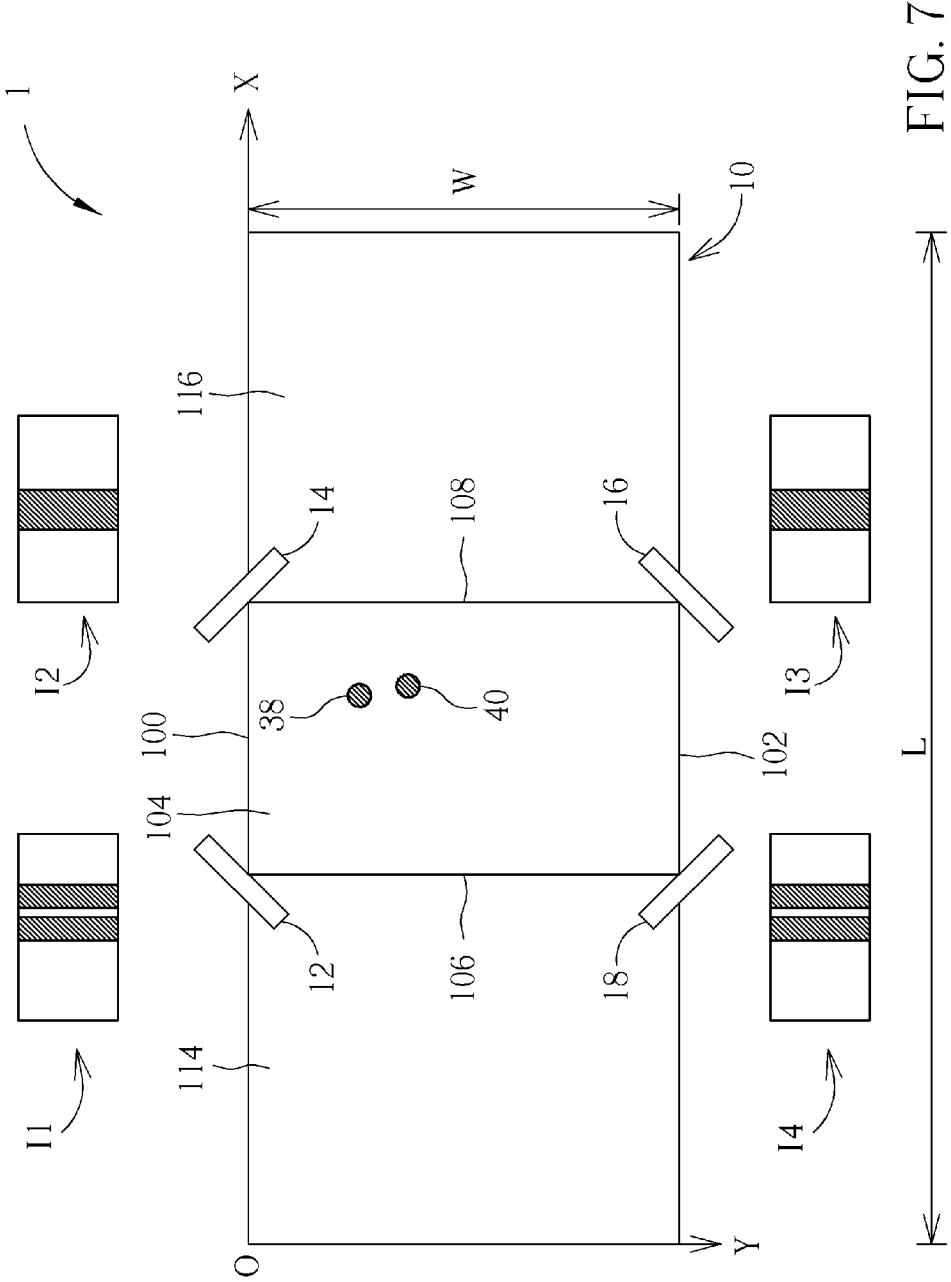
FIG. 7 is a schematic diagram illustrating two touch points generated on the central touch area.

Referring to FIG. 7, FIG. 7 is a schematic diagram illustrating two touch points 38, 40 generated on the central touch area 104. As shown in FIG. 7, two touch points 38, 40 overlap within the second image I2 and the third image I3, so the processing unit 20 will calculate only one touch point (i.e. M=1) according to the second image I2 and the third image I3. Furthermore, the two touch points 38, 40 are separated within the first image I1 and the fourth image I4, so the processing unit 20 will calculate two touch points (i.e. N=2) according to the first image I1 and the fourth image I4. At this time, the processing unit 20 can immediately calculate and output the coordinates of the two touch points 38, 40 by the aforesaid equation 1, so as to avoid mis-identification due to overlapped touch points.

Figure 8:
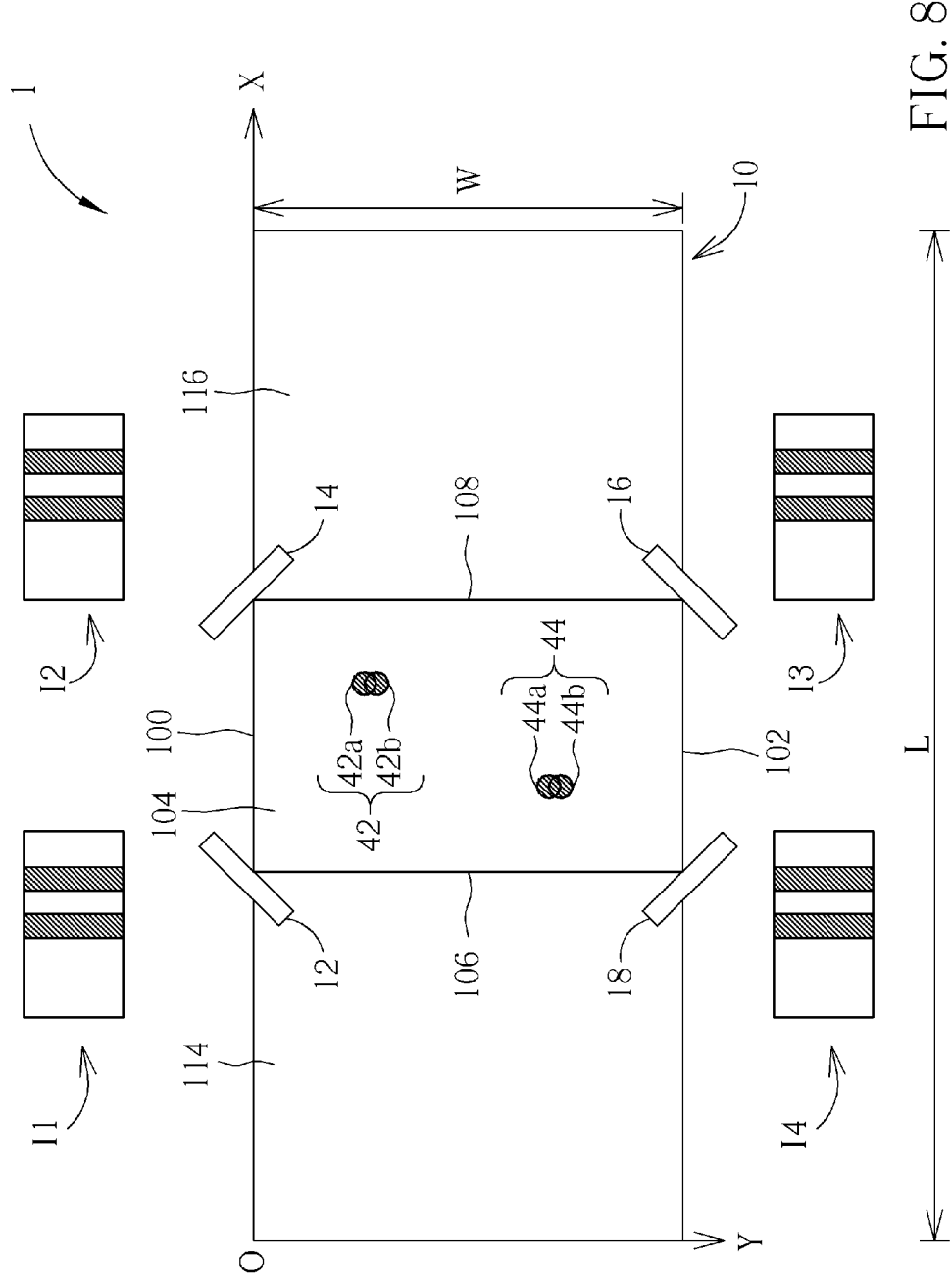
FIG. 8 is a schematic diagram illustrating two touch points generated on the central touch area.

Referring to FIG. 8, FIG. 8 is a schematic diagram illustrating two touch points 42, 44 generated on the central touch area 104. As shown in FIG. 8, two touch points 42, 44 are separated within the first image I1, the second image I2, the third image I3 and the fourth image I4, so the processing unit 20 will calculate two touch points 42a, 44a (i.e. N=2) according to the first image I1 and the fourth image I4 and calculate two touch points 42b, 44b (i.e. M=2) according to the second image I2 and the third image I3. At this time, the processing unit 20 can match the touch points 42a, 44a, 42b, 44b one by one according to the shortest distance between every two touch points, so as to obtain two pairs of touch points. In the embodiment shown in FIG. 8, the touch points 42a, 42b are one pair and the touch points 44a, 44b are the other pair. Afterward, the processing unit 20 can utilize the aforesaid weighting W to integrate the coordinates of the two pair of touch points by the aforesaid equation 3, so as to calculate two output coordinates of the two pair of touch points, wherein the two output coordinates are the output coordinates of the two touch points 42, 44.

Figure 9:
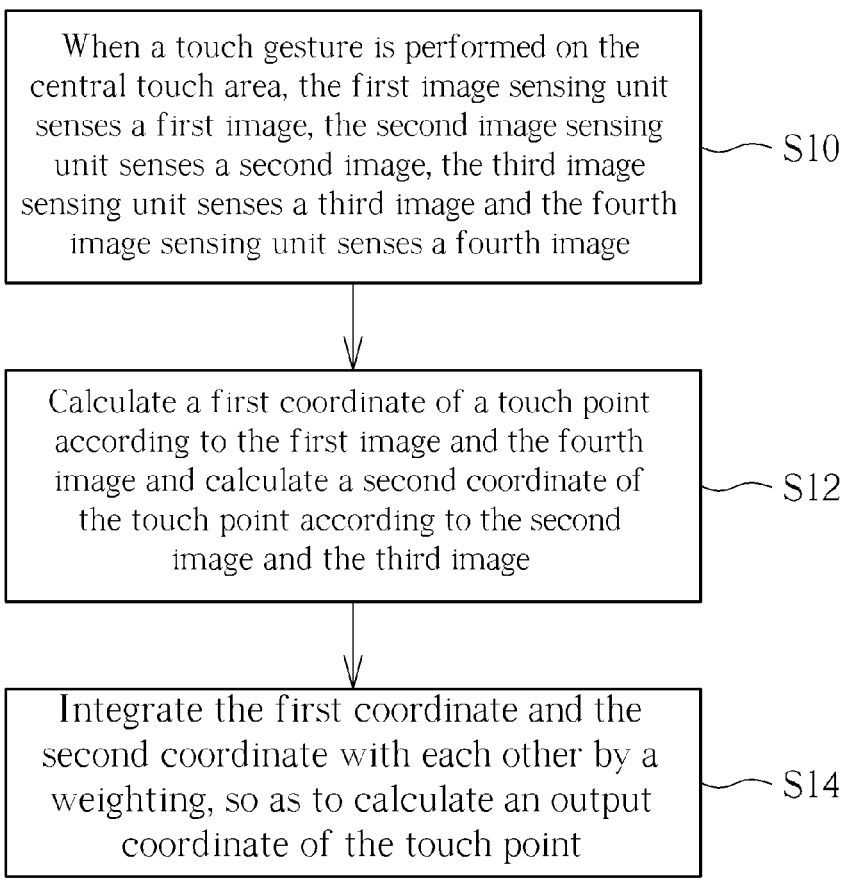
FIG. 9 is a flowchart illustrating a method for calculating coordinate of touch point according to an embodiment of the invention.

Referring to FIG. 9, FIG. 9 is a flowchart illustrating a method for calculating coordinate of touch point according to an embodiment of the invention. The method for calculating coordinate of touch point shown in FIG. 9 is adapted to the aforesaid optical touch device 1. Furthermore, the control logic of the method for calculating coordinate of touch point shown in FIG. 9 can be implemented by circuit and software designs. First of all, in step S10, when a touch gesture is performed on the central touch area 104, the first image sensing unit 12 senses a first image I1, the second image sensing unit 14 senses a second image I2, the third image sensing unit 16 senses a third image I3 and the fourth image sensing unit 18 senses a fourth image I4. Afterward, step S12 is performed to calculate a first coordinate of a touch point according to the first image I1 and the fourth image I4 and calculate a second coordinate of the touch point according to the second image I2 and the third image I3. Finally, step S14 is performed to integrate the first coordinate and the second coordinate with each other by a weighting, so as to calculate an output coordinate of the touch point.

Figure 10:
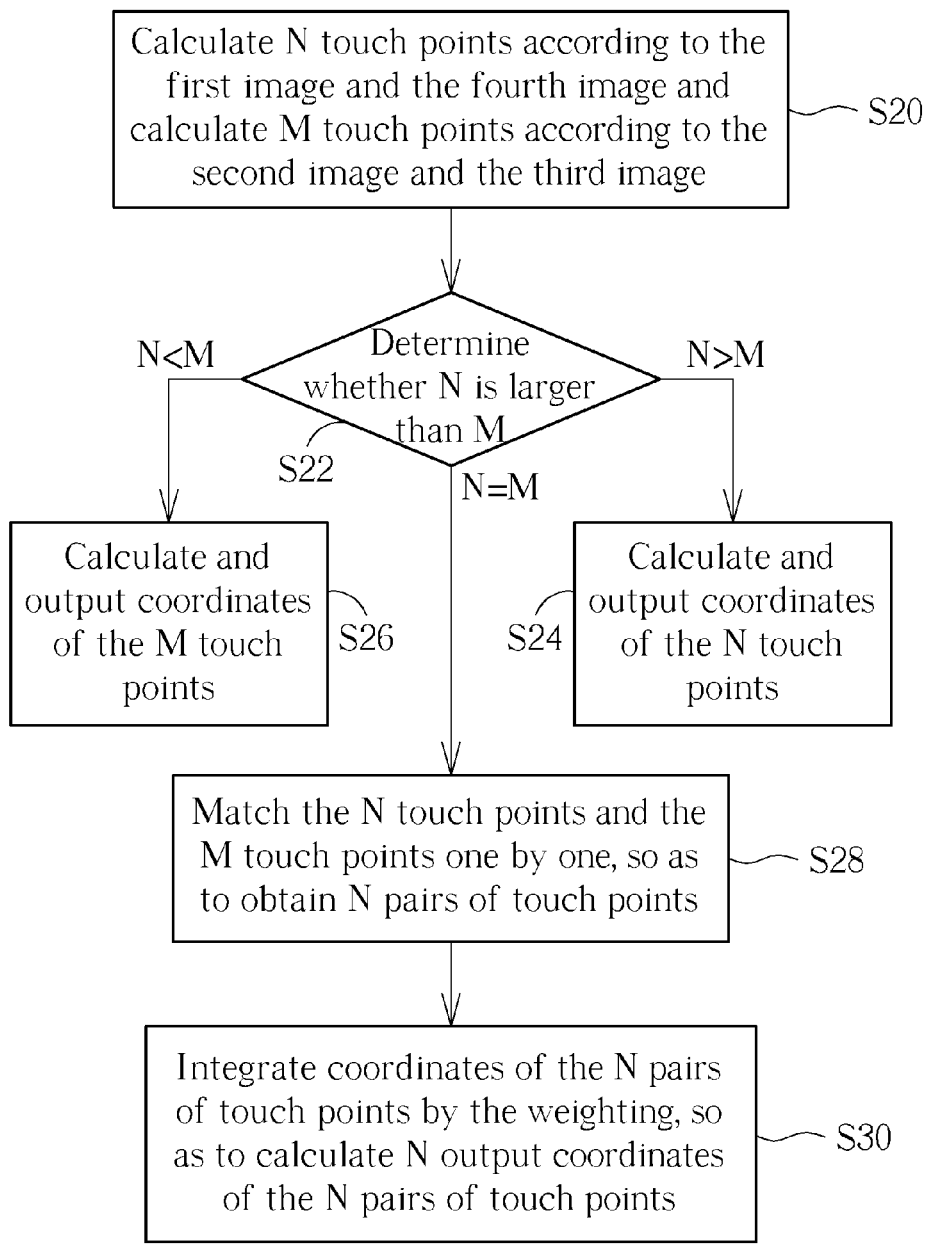
FIG. 10 is a flowchart illustrating a method for calculating coordinate of touch point according to another embodiment of the invention.

Referring to FIG. 10, FIG. 10 is a flowchart illustrating a method for calculating coordinate of touch point according to another embodiment of the invention. The method for calculating coordinate of touch point shown in FIG. 10 is adapted to the aforesaid optical touch device 1. Furthermore, the control logic of the method for calculating coordinate of touch point shown in FIG. 10 can be implemented by circuit and software designs. First of all, step S20 is performed to calculate N touch points according to the first image I1 and the fourth image I4 and calculate M touch points according to the second image I2 and the third image I3, wherein N and M are positive integers. Afterward, step S22 is performed to determine whether N is larger than M. When N is larger than M, step S24 is performed to calculate and output coordinates of the N touch points. When N is smaller than M, step S26 is performed to calculate and output coordinates of the M touch points. When N is equal to M, step S28 is performed to match the N touch points and the M touch points one by one, so as to obtain N pairs of touch points. Then, step S30 is performed to integrate coordinates of the N pairs of touch points by the weighting, so as to calculate N output coordinates of the N pairs of touch points.

It should be noted that the other operation principles of the method for calculating coordinate of touch point of the invention are mentioned in the above and those will not be depicted herein again.

As mentioned in the above, the invention utilizes a weighting to integrate two coordinates of a touch point sensed by two sets of image sensing units, so as to calculate an output coordinate of the touch point performed on a central touch area. Accordingly, the invention can effectively prevent a touch trajectory from shifting on the central touch area, such that the touch trajectory will be much smoother on the central touch area.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical touch device comprising:
an indication plane having a first edge and a second edge, the first edge being opposite to the second edge;
a first image sensing unit and a second image sensing unit separately disposed on the first edge;
a third image sensing unit and a fourth image sensing unit separately disposed on the second edge, the first image sensing unit being opposite to the fourth image sensing unit, the second image sensing unit being opposite to the third image sensing unit, a central touch area being defined between the first image sensing unit, the second image sensing unit, the third image sensing unit and the fourth image sensing unit; and
a processing unit electrically connected to the first image sensing unit, the second image sensing unit, the third image sensing unit and the fourth image sensing unit;
wherein when a touch gesture is performed on the central touch area, the first image sensing unit senses a first image, the second image sensing unit senses a second image, the third image sensing unit senses a third image and the fourth image sensing unit senses a fourth image; the processing unit calculates a first coordinate of a touch point according to the first image and the fourth image, calculates a second coordinate of the touch point according to the second image and the third image, and integrates the first coordinate and the second coordinate with each other by a weighting, so as to calculate an output coordinate of the touch point.

2. The optical touch device of claim 1, wherein the processing unit calculates the output coordinate of the touch point by equations as follows:

$$X_T = X_1 \times W + X_2 \times (1-W); \text{ and}$$

$$Y_T = Y_1 \times W + Y_2 \times (1-W);$$

wherein $(X_T, Y_T)$ represents the output coordinate, $(X_1, Y_1)$ represents the first coordinate, $(X_2, Y_2)$ represents the second coordinate, and W represents the weighting.

3. The optical touch device of claim 2, wherein a first boundary of the central touch area connects the first image sensing unit and the fourth image sensing unit, a second boundary of the central touch area connects the second image sensing unit and the third image sensing unit, a first critical line and a second critical line are defined in the central touch area, a threshold distance is between the first critical line and the first boundary, the threshold distance is between the second critical line and the second boundary; when the touch point is located between the first boundary and the first critical line, the weighting is equal to 0; when the touch point is located between the second boundary and the second critical line, the weighting is equal to 1; when the touch point is located between the first critical line and the second critical line, the weighting is equal to $$\frac{d-T}{D-2T},$$

d represents a distance between the touch point and the first boundary, T represents the threshold distance, and D represents a distance between the first boundary and the second boundary.

4. The optical touch device of claim 1, wherein when the processing unit calculates N touch points according to the first image and the fourth image and calculates M touch points according to the second image and the third image, the processing unit determines whether N is larger than M, N and M are positive integers; when N is larger than M, the processing unit calculates and outputs coordinates of the N touch points;

when N is smaller than M, the processing unit calculates and outputs coordinates of the M touch points.

5. The optical touch device of claim 4, wherein when N is equal to M, the processing unit matches the N touch points and the M touch points one by one, so as to obtain N pairs of touch points; the processing unit integrates coordinates of the N pairs of touch points by the weighting, so as to calculate N output coordinates of the N pairs of touch points.

6. A method for calculating coordinate of touch point adapted to an optical touch device, the optical touch device comprising an indication plane, a first image sensing unit, a second image sensing unit, a third image sensing unit and a fourth image sensing unit, the indication plane having a first edge and a second edge, the first edge being opposite to the second edge, the first image sensing unit and the second image sensing unit being separately disposed on the first edge, the third image sensing unit and the fourth image sensing unit being separately disposed on the second edge, the first image sensing unit being opposite to the fourth image sensing unit, the second image sensing unit being opposite to the third image sensing unit, a central touch area being defined between the first image sensing unit, the second image sensing unit, the third image sensing unit and the fourth image sensing unit, the method comprising:
  when a touch gesture is performed on the central touch area, the first image sensing unit sensing a first image, the second image sensing unit sensing a second image, the third image sensing unit sensing a third image and the fourth image sensing unit sensing a fourth image;
  calculating a first coordinate of a touch point according to the first image and the fourth image;
  calculating a second coordinate of the touch point according to the second image and the third image; and
  integrating the first coordinate and the second coordinate with each other by a weighting, so as to calculate an output coordinate of the touch point.

7. The method of claim 6, wherein the output coordinate of the touch point is calculated by equations as follows:

$X_T = X_1 \times W + X_2 \times (1-W)$; and $Y_T = Y_1 \times W + Y_2 \times (1-W)$;

wherein $(X_T, Y_T)$ represents the output coordinate, $(X_1, Y_1)$ represents the first coordinate, $(X_2, Y_2)$ represents the second coordinate, and W represents the weighting.

8. The method of claim 7, wherein a first boundary of the central touch area connects the first image sensing unit and the fourth image sensing unit, a second boundary of the central touch area connects the second image sensing unit and the third image sensing unit, a first critical line and a second critical line are defined in the central touch area, a threshold distance is between the first critical line and the first boundary, the threshold distance is between the second critical line and the second boundary; when the touch point is located between the first boundary and the first critical line, the weighting is equal to 0; when the touch point is located between the second boundary and the second critical line, the weighting is equal to 1; when the touch point is located between the first critical line and the second critical line, the weighting is equal to $$\frac{d-T}{D-2T},$$

d represents a distance between the touch point and the first boundary, T represents the threshold distance, and D represents a distance between the first boundary and the second boundary.

9. The method of claim 6, further comprising:
  calculating N touch points according to the first image and the fourth image and calculating M touch points according to the second image and the third image, wherein N and M are positive integers;
  determining whether N is larger than M;
  when N is larger than M, calculating and outputting coordinates of the N touch points; and
  when N is smaller than M, calculating and outputting coordinates of the M touch points.

10. The method of claim 9, further comprising:
  when N is equal to M, matching the N touch points and the M touch points one by one, so as to obtain N pairs of touch points; and
  integrating coordinates of the N pairs of touch points by the weighting, so as to calculate N output coordinates of the N pairs of touch points.

* * * * *